United States Patent
Yang (10) Patent No.: US 10,062,001 B2
(45) Date of Patent: Aug. 28, 2018

(54) METHOD FOR LINE AND WORD SEGMENTATION FOR HANDWRITTEN TEXT IMAGES

(71) Applicant: KONICA MINOLTA LABORATORY U.S.A., INC., San Mateo, CA (US)

(72) Inventor: Duanduan Yang, San Jose, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 35 days.

(21) Appl. No.: 15/279,979

(22) Filed: Sep. 29, 2016

(65) Prior Publication Data

US 2018/0089525 A1    Mar. 29, 2018

(51) Int. Cl.
*G06K 9/34*   (2006.01)
*G06K 9/72*   (2006.01)
*G06K 9/00*   (2006.01)

(52) U.S. Cl.
CPC ......... *G06K 9/346* (2013.01); *G06K 9/00859* (2013.01); *G06K 9/344* (2013.01); *G06K 9/72* (2013.01); *G06K 2209/01* (2013.01)

(58) Field of Classification Search
CPC .......... G06K 2209/01; G06K 9/00993; G06K 9/6857; G06T 7/11; G06T 11/60
See application file for complete search history.

(56) References Cited

U.S. PATENT DOCUMENTS

| 5,933,525 | A | 8/1999 | Makhoul et al. | |
|---|---|---|---|---|
| 2007/0041642 | A1* | 2/2007 | Romanoff | G06K 9/00463 382/177 |
| 2011/0182513 | A1* | 7/2011 | Eshghi | G06K 9/00442 382/177 |
| 2014/0185933 | A1* | 7/2014 | Tian | G06K 9/00577 382/173 |
| 2015/0269431 | A1* | 9/2015 | Haji | G06K 9/00879 382/186 |

FOREIGN PATENT DOCUMENTS

CN    100527156 C    8/2009

* cited by examiner

*Primary Examiner* — Eueng-Nan Yeh
(74) *Attorney, Agent, or Firm* — Chen Yoshimura LLP (57) ABSTRACT

A method for segmenting an image containing handwritten text into line segments and word segments. The image is horizontally down sampled at a first ratio. Connected regions in the down-sampled image are detected; horizontal neighboring ones are merged to form lines, to segment the original image into line images. Each line image is horizontally down sampled at a second ratio which is smaller than the first ratio. Connected regions in the down-sampled line image are detected to obtain potential word segmentation positions. A path is a way of dividing the line at some or all of the potential word segmentation positions into multiple path segments; for each of all possible paths, word recognition is applied to each path segment to calculate a word recognition score, and an average word recognition score for the path is calculated; the path with the highest score gives the final word segmentation.

16 Claims, 6 Drawing Sheets

Path(1)

Path(n)

Path(m)

METHOD FOR LINE AND WORD SEGMENTATION FOR HANDWRITTEN TEXT IMAGES

BACKGROUND OF THE INVENTION

Field of the Invention

This invention relates to a method for handwritten text recognition, and in particular, to a method of segmenting lines and words from a handwritten text image.

Description of Related Art

Handwriting recognition plays an important role in the field of artificial intelligence. It represents the ability of a computer to receive and interpret intelligible handwritten input from sources such as paper documents, photographs, touch-screens and other devices. Processing an image containing text may involve, for example, extracting a text region from the image, extracting lines of text from the region (line segmentation), then extracting words of text from the lines (word segmentation), before applying text recognition.

For handwritten text, line and word segmentation often present a challenge because there are many variances in the handwriting. Some methods have been proposed for this task. For example, U.S. Pat. Appl. Pub. No. 2007/0041642, entitled "Post-OCR image segmentation into spatially separated text zones", describes "a post-recognition procedure to group text recognized by an Optical Character Reader (OCR) from a document image into zones. Once the recognized text and the corresponding word bounding boxes for each word of the text are received, the procedure described dilates (expands) these word bounding boxes by a factor and records those which cross. Two word bounding boxes will cross upon dilation if the corresponding words are very close to each other on the original document. The text is then grouped into zones using the rule that two words will belong to the same zone if their word bounding boxes cross upon dilation. The text zones thus identified are sorted and returned." (Abstract.)

U.S. Pat. No. 5,933,525, entitled "Language-independent and segmentation-free optical character recognition system and method", describes "a language-independent and segment free OCR system and method [which] comprises a unique feature extraction approach which represents two dimensional data relating to OCR as one independent variable (specifically the position within a line of text in the direction of the line) so that the same CSR technology based on HMMs can be adapted in a straightforward manner to recognize optical characters. After a line finding stage, followed by a simple feature-extraction stage, the system can utilize a commercially available CSR system, with little or no modification, to perform the recognition of text by and training of the system. The whole system, including the feature extraction, training, and recognition components, are designed to be independent of the script or language of the text being recognized. The language-dependent parts of the system are confined to the lexicon and training data. Furthermore, the method of recognition does not require pre-segmentation of the data at the character and/or word levels, neither for training nor for recognition. In addition, a language model can be used to enhance system performance as an integral part of the recognition process and not as a post-process, as is commonly done with spell checking, for example." (Abstract.)

Chinese Patent Appl. Pub. No. CN 100527156C, entitled "Picture words segmentation method", describes "a method for detecting text image, comprising the steps of: (1) The combined picture on each color component edge map obtained cumulative edge map; (2) the cumulative edge map is set for an edge point in the picture of the respective colors, depending on the color point edge, with the clustering of the cumulative edge map is divided into several sub-edge map sheets, each sub-edge map contains similar color edge points; (3) in each sub-edge map, multiple horizontal and vertical projection, according to the regional projection in the vertical direction and horizontal segmentation, positioning text in the image area. In the present invention, after obtaining original cumulative edge map using the clustering method based on the color of the cumulative edge map is divided into several sub-edge map, edge map of the sub edge is simplified, so that the detection area is relatively simple text pictures and accurate." (Abstract.)

SUMMARY

The present invention is directed to a line segmentation and word segmentation method for segmenting handwritten text.

An object of the present invention is to provide a method to segment text lines and words which balance the accuracy and the efficiency.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented on a computer for segmenting an input image into line segments and word segments, the input image being a binary image containing text, the method including: (a) horizontally down sampling the input image using a first down-sampling ratio; (b) detecting connected regions in the down-sampled image obtained in step (a); (c) identifying horizontally neighboring connected regions that belong to same lines to form line lists containing such horizontally neighboring connected regions; (d) segmenting the input image into a plurality of line segments, each line segment being a region of the input image that corresponds to a bounding box in the down-sampled image containing all connected regions in a corresponding line lists obtained in step (c); and for each of the line segments obtained in step (d): (e) horizontally down sampling the line segment using a second down-sampling ratio; (f) detecting connected regions in the down-sampled line segment obtained in step (e); and (g) segmenting the line segment obtained from step (d) into word segments using the connected regions obtained in step (f), wherein the second down-sampling ratio is smaller than the first down-sampling ratio.

In another aspect, the present invention provides a computer program product comprising a computer usable non-transitory medium (e.g. memory or storage device) having a computer readable program code embedded therein for controlling a data processing system, the data processing system comprising a computer and one or more printers, the computer readable program code configured to cause the computer in the data processing system to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 3:
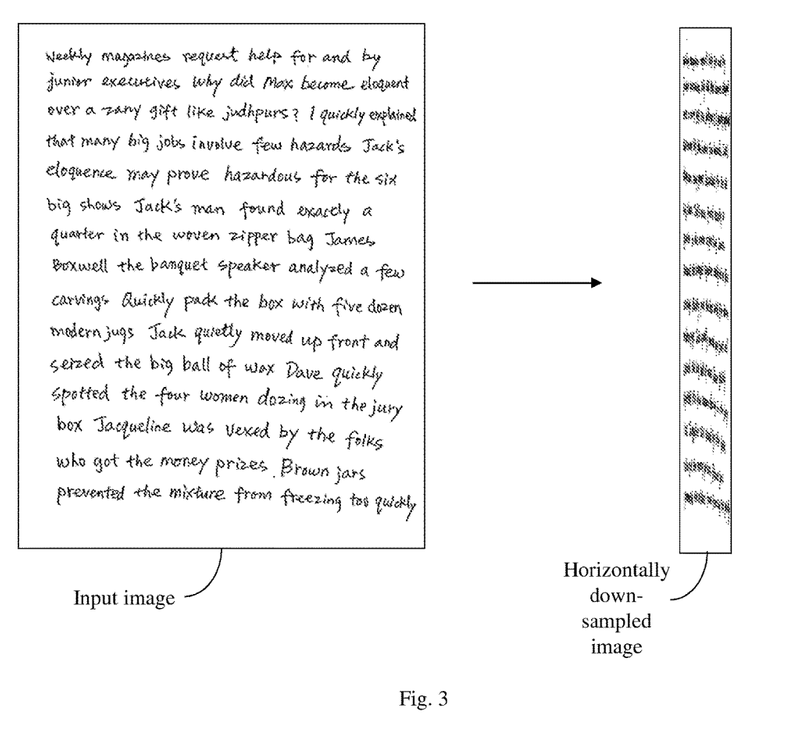
FIG. 3 schematically illustrates horizontal down sampling of an exemplary text image in the embodiment of the present invention.

The handwritten text segmentation method according embodiments of the present invention performs line segmentation first to segment the input text image into lines, and then word segmentation to segment each line into words. To perform line segmentation, the input image is down-sampled in the horizontal direction using a first down-sampling ratio, so that the texts in the same line of the down-sampled image will tend to cling to each other, as shown in the example of FIG. 3. Connected regions in the down-sampled image are detected, and are used to detect lines and to segment lines in the original image. Then, each segmented line of the original input image is down-sampled in the horizontal direction using a second down-sampling ratio, which is smaller than the first down-sampling ratio and may be different for different lines, so that the text characters from each single word in the down-sampled line image will tend to cling to each other. Connected regions in the down-sampled line segment are detected, and are used to detect words and segment the line segment into word segments.

Figure 1:
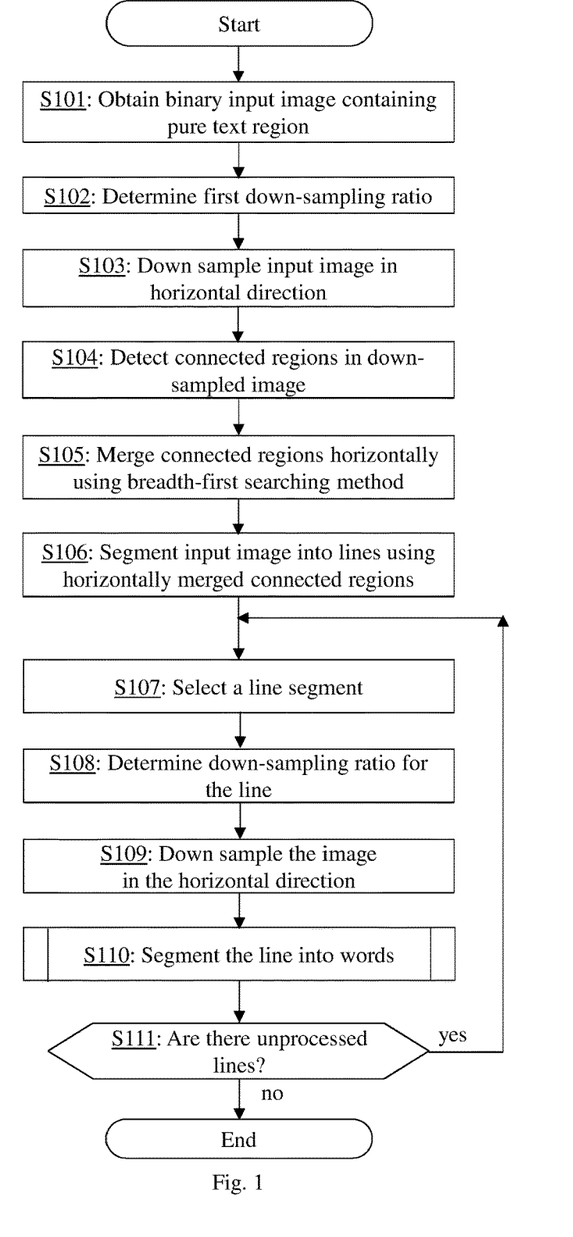
FIGS. 1 and 2 are flow charts that schematically illustrate a handwritten text segmentation method including line segmentation and word segmentation according to embodiments of the present invention.
Figure 2:
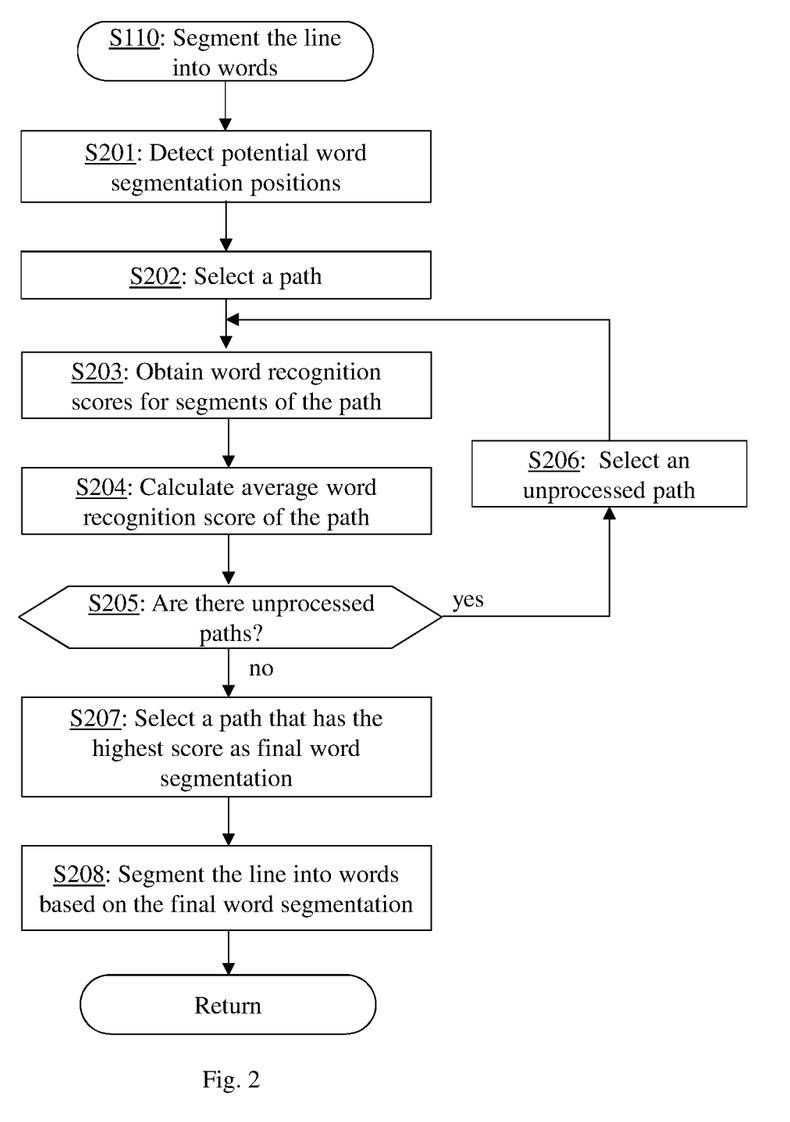

A handwritten text segmentation method according to embodiments of the present invention is described in more detail with reference to the flow chart of FIGS. 1 and 2. The step of obtaining an input image (step S101) may include binarizing the original image if it is a color or grayscale image. In the description below, the input image is a binary image. The input image is a pure text image, meaning that it contains text but does not contain other objects such as pictures or graphics and that the text is not dispersed in tables or flowcharts or other kinds of charts. In the descriptions below, it is assumed that text lines run in the horizontal or near horizontal direction. Those skilled in the art will appreciate that the method can be easily modified to handle text lines that run in the vertical or near vertical direction.

First, a first down-sampling ratio N is calculated (step S102) and the input image is down-sampled in the horizontal direction using the first down-sampling ratio (step S103). In other words, every N-th vertical column of pixels in the input image is taken to form the horizontally down-sampled image. The first down-sampling ratio N is calculated (step S102) as follows.

The connected regions in the input image are detected. In a binary image, a connected region (sometimes also referred to as connected component) is a group of foreground pixels (e.g. black pixels for a black-text-on-white-background image) that are connected to each other. Any suitable method may be used to detect the connected regions. The horizontal distance between each pair of horizontally adjacent connected regions is determined. An average value of all such distances is calculated, and the first down-sampling ratio N is set based on the calculated average distance. In a preferred embodiment, the first down-sampling ratio N is equal to three times the average distance.

In the above calculation, two connected regions are deemed to be horizontally adjacent if their vertical positions are different from each other by no more than a predetermined threshold and they are not separated by other connected regions. The distance between two horizontally adjacent connected regions may be defined as the distance between the two respective bounding boxes of the two connected regions. A bounding box of a connected region is the smallest rectangular box that completely contains the connected region.

Preferably, in step S103, the input image is down-sampled only horizontally, but down-sampling vertically may be performed in addition to horizontal down-sampling if the down-sampling ratio for the vertical direction is much smaller than that for the horizontal direction.

After horizontal down-sampling (step S103), all connected regions in the horizontally down-sampled image are detected (step S104), and their corresponding bounding boxes are generated and stored into a set (set A).

The detected connected regions are horizontally merged together (step S105). Horizontal merging is performed by identifying horizontally neighboring connected regions that belong to the same line to form lists of such horizontal neighbors.

More specifically, for a given connected region, if another connected region (1) has a vertical position that is offset from that of the given connected region by an amount smaller than a predetermined threshold, and (2) among all of the connected regions that meet criterion (1), is located closest to the given connected region to its left or right, then the other connected region is deemed to be a horizontal neighbor located on the same line as the given connected region. To perform the merging step, a search is conducted, starting from a connected region C, which may be one randomly selected from set A, to find its horizontal neighbors that meet the above-described criteria (there may be zero, one or two such neighbors). The horizontal neighbors so found are added to a line list that contains the connected region C. The search is conducted again using each of the already found horizontal neighbors as the current connected region to find additional connected regions on the same line. The search continues until no connected regions meeting the above criteria can be found. The already found connected regions are removed form set A. Such a search is similar in concept to a breath-first search algorithm for searching a graph. As a result, one line list is generated, which contains the connected region C and other connected regions found in the search. Then, another connected region is randomly selected from the remaining connected regions in set A, and the above-described search is performed to generate another line list. This continues until set A is empty. As a result, a number of line lists are generated.

Figure 4:
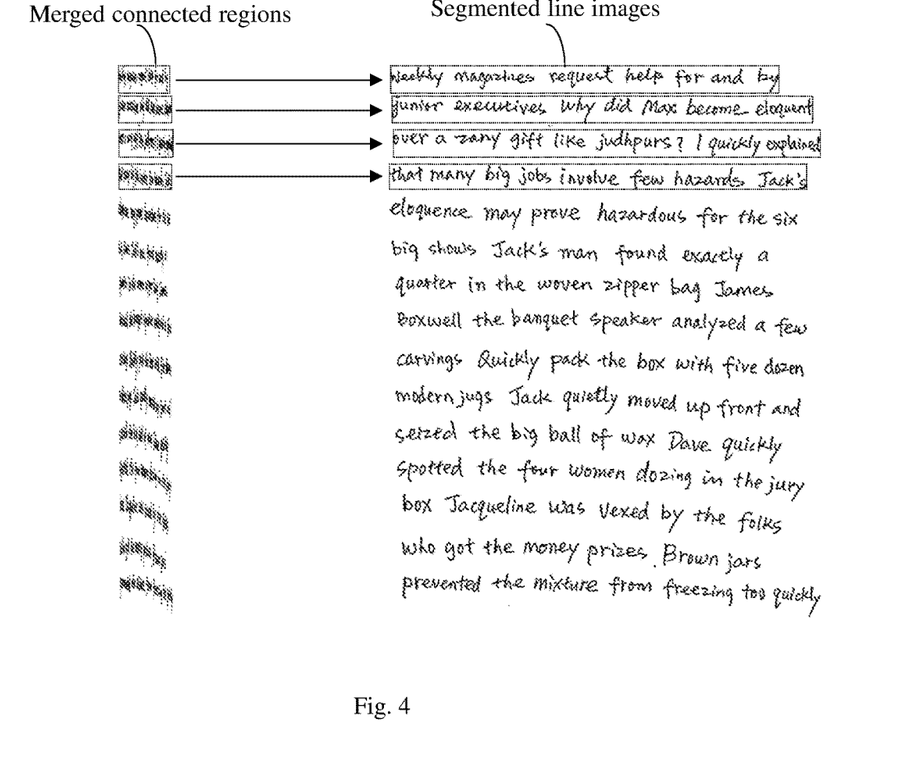
FIG. 4 schematically illustrates an exemplary line segmentation of the text image of FIG. 3.

The input image is segmented into lines using the lines lists of the horizontally merged connected regions (step S106). More specifically, for each line list, a bounding box is generated in the down-sampled image that encloses all connected regions in that line list. Examples of such bounding boxes in the down-sampled image are shown in FIG. 4, left hand side. A corresponding bounding box is generated in the original (prior to down-sampling) image, which constitutes a line segment of the original image. Examples of such bounding boxes in the original image are shown in FIG. 4, right hand side. As a result, a plurality of line segments are generated.

Figure 5:
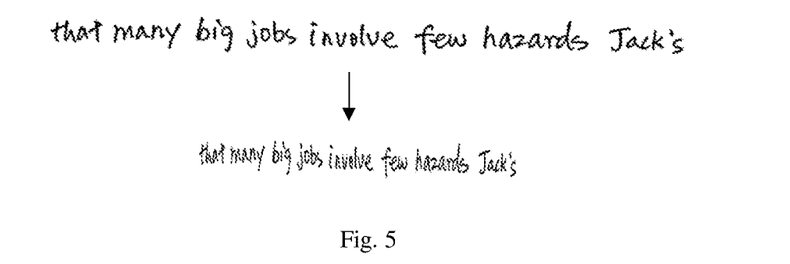
FIG. 5 schematically illustrates an exemplary horizontal down sampling of the text image of FIG. 3.

To perform word segmentation, each individual line segment (i.e. an image patch contained in one line bounding box) is horizontally down-sampled using a second down-sampling ratio $M_i$, where i is an index of the lines (steps S107-S109). More specifically, for each line segment (step S107), the second down-sampling ratio $M_i$ is determined (step S108), and the line image is down-sampled in the horizontal direction using the second down-sampling ratio $M_i$ (step S109). In other words, every $M_i$-th vertical column of pixels in the line segment is taken to form the horizontally down-sampled line segment. FIG. 5 illustrates an example of down-sampling of a text line.

In one embodiment, the second down-sampling ratio Mi is determined in step S108 as follows. The connected regions in the line segment are detected; horizontal distance between each pair of horizontally adjacent connected regions is determined; an average value of all such distances is calculated; and the second down-sampling ratio $M_i$ is set based on the calculated average distance. In a preferred embodiment, the second down-sampling ratio $M_i$ is equal to the average distance.

Preferably, in step S109, the line image is down-sampled only horizontally, but down-sampling vertically may be performed in addition to horizontal down-sampling if the down-sampling ratio for the vertical direction is much smaller than that for the horizontal direction.

A process S110 is then performed to segment each line into word segments. This process is described below with reference to FIG. 2.

First, connected regions in the down-sampled line segment are detected, and they are used to determine the potential word segmentation positions in the original (prior to down-sampling) line segment (step S201). The potential word segmentation positions in the original line segment are set at positions corresponding to locations in the gaps between connected regions in the down-sampled line segments, in other words, the text content between the potential word segmentation positions correspond to the connected regions detected in the down-sampled line segments.

Then, word segmentation is performed on the original line segment using a path-score comparison approach, described in more detail below.

Figure 6A:
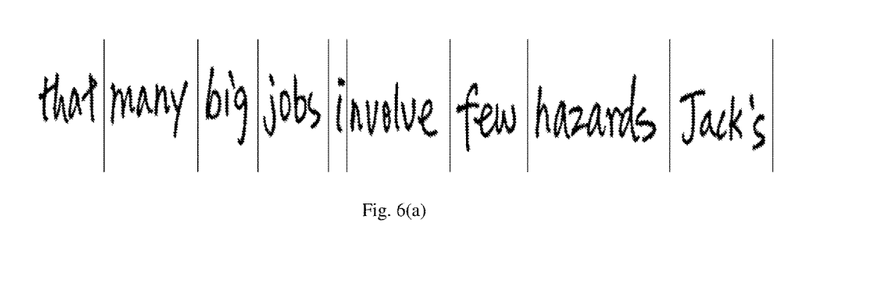
FIGS. 6(a) and 6(b) schematically illustrate examples of paths used in word segmentation according to an embodiments of the present invention.
Figure 6B:
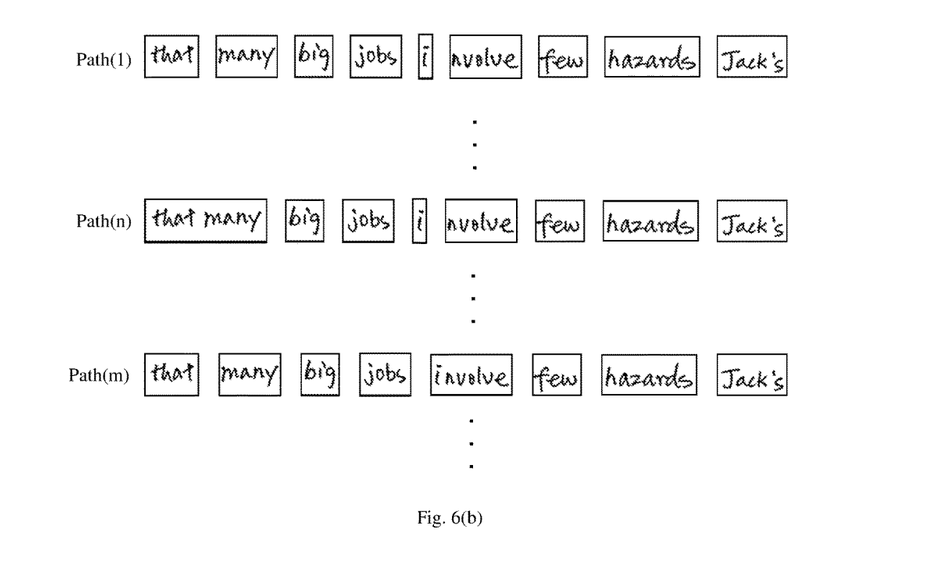

A path is a way of dividing the line segment at all or some of the potential word segmentation positions, to divide the line into multiple segments (referred to as "path segments" for convenience). For example, in the example shown in FIG. 6(*a*), the text line segment has nine potential word segmentation positions; each example in FIG. 6(*b*) schematically depicts a path. In the exemplary Path(1), the line segment is divided at all nine potential word segmentation positions; in the exemplary Path(n), the line segment is divided at all but the first one of the potential word segmentation positions (so the first and second connected regions become one path segment); in the exemplary Path (m), the line segment is divided at all but the fifth one of the potential word segmentation positions (so the fifth and sixth connected regions become one path segment); etc.

A path may also be viewed as a way of merging some or all of the adjacent connected regions. Thus, exemplary Path(1) is a path where each connected regions is a path segment (no merging); exemplary Path(n) is a path where the first and second connected regions are merged to become one path segment; exemplary Path(m) is a path where the fifth and sixth connected regions are merged to become one path segment; etc.

In a broader sense, a "path" of an image consists of a series of image segments covering every pixel of an image, where each segment comprises a number of different and non-overlapping pixels in the input image.

The path-score comparison evaluates all possible paths that can be formed for the line based on the potential word segmentation positions. For each path (step S202 and step S206), word recognition is applied to each path segment to calculate a word recognition score (step S203), and the scores for all path segments are averaged to calculate an average word recognition score for the path (step S204). Word recognition is a process that compares an image patch to a collection of samples to determine a score representing how likely the image segment is a word. Any suitable word recognition algorithm may be used for this step. The average word recognition scores are calculated for all possible paths (step S205). Among all possible paths, the path having the highest average word recognition score is determined to be the final word segmentation for the line (step S207), and the line image is segmented into word images accordingly (step S208).

For example, in the examples of FIG. 6(*b*), Path(n) will have a lower score than Path(1) and Path(n) will have a lower score than Path(m) because the path segment "that many" is not a word, nor is "nvolve". Path(m) will likely be the one with the highest score among all possible paths.

The purpose of using the path scoring method is to find an optimal path based on which words in the input image can be recognized with the most accuracy, thereby enhancing the accuracy of handwriting recognition.

Referring back to FIG. 1, steps S107 to S110 are repeated for each line segment (step S111).

Figure 7:
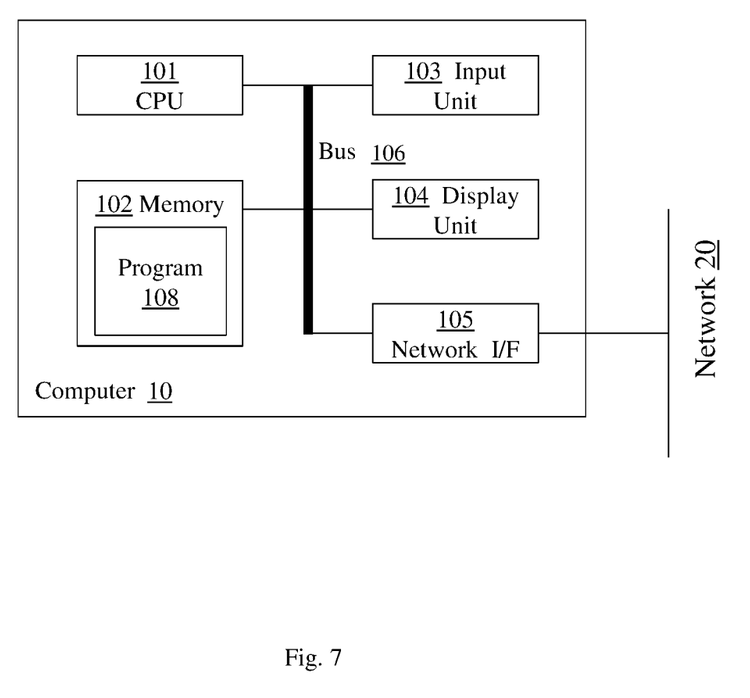
FIG. 7 is a block diagram of a computer system in which embodiments of the present invention may be implemented.

FIG. 7 is a block diagram of an exemplary computer in which embodiments of the present invention may be implemented. As shown in FIG. 1, this computer 10 comprises a Central Processing Unit (CPU) 101, a memory 102, an input unit 103 such as a keyboard or a tablet stylus pen, a display unit 104 such as a computer monitor or touchscreen display, and a network interface 105, all these components (including those not shown) communicating with each other internally via a bus 106. Through the network interface 105, the computer 10 is connected to a network 20, such as a LAN or WAN, and communicate with other devices connected to the network.

Usually the memory 102 stores computer-executable instructions or software programs accessible to the CPU 101, which is configured to execute these software programs as needed in operation. Preferably, such software programs are designed to run on Windows OS, Macintosh OS, or Unix X Windows or other popular computer operating systems implementing a GUI (graphic user interface), such as a touchscreen and/or a mouse and a keyboard, coupled with a display monitor. In one embodiment, such software in the memory 102 includes a program 108, which, when executed by the CPU 101, performs the line and word segmentation method described above. In addition to the recognizing program 108, the CPU 101 is also configured to execute other types of software (e.g., administrative software), applications (e.g., network communication application), operating systems, etc.

It will be apparent to those skilled in the art that various modification and variations can be made in the above-described line and word segmentation method for processing handwritten text images and related apparatus and system of the present invention without departing from the spirit or scope of the invention. Thus, it is intended that the present invention cover modifications and variations that come within the scope of the appended claims and their equivalents.

What is claimed is:

1. A method implemented on a computer for segmenting an input image into line segments and word segments, the input image being a binary image containing text, the method comprising:
   (a) horizontally down sampling the input image using a first down-sampling ratio;
   (b) detecting connected regions in the down-sampled image obtained in step (a);
   (c) identifying horizontally neighboring connected regions that belong to same lines to form line lists containing such horizontally neighboring connected regions;
   (d) segmenting the input image into a plurality of line segments of the input image, each line segment of the input image being a region of the input image that corresponds to a bounding box in the down-sampled image containing all connected regions in a corresponding line list obtained in step (c); and
   for each of the line segments of the input image obtained in step (d),
   (e) horizontally down sampling the line segment of the input image using a second down-sampling ratio;
   (f) detecting connected regions in the down-sampled line segment obtained in step (e); and
   (g) segmenting the line segment of the input image into word segments at one or more word segmentation positions using the connected regions obtained in step (f), wherein the word segmentation positions are a subset of positions corresponding to locations in gaps between the connected regions in the down-sampled line segment of step (e) that have been detected in step (f),
   wherein the second down-sampling ratio is smaller than the first down-sampling ratio.

2. The method of claim 1, wherein the first down-sampling ratio is calculated from the input image, and the second down-sampling ratio for each line segment is calculated from the line segment.

3. The method of claim 2, further comprising, before step (a), calculating the first down-sampling ratio, which comprises:
   (h1) detecting connected regions in the input image;
   (h2) calculating a horizontal distance between each pair of horizontally adjacent connected regions detected in step (h1);
   (h3) calculating a first average horizontal distance which is an average of all horizontal distances calculated in step (h2); and
   (h4) setting the first down-sampling ratio based on the first average horizontal distance calculated in step (h3).

4. The method of claim 3, wherein in step (h4), the first down-sampling ratio is equal to three times the first average horizontal distance.

5. The method of claim 4, further comprising, before step (e), calculating the second down-sampling ratio, which comprises:
   (i1) detecting connected regions in the line segment obtained in step (d);
   (i2) calculating a horizontal distance between each pair of horizontally adjacent connected regions obtained in step (i1);
   (i3) calculating a second average horizontal distance which is an average of all horizontal distances calculated in step (i2); and
   (i4) setting the second down-sampling ratio based on the second average horizontal distance calculated in step (i3).

6. The method of claim 5, wherein in step (i4), the second down-sampling ratio is equal to the second average horizontal distance.

7. The method of claim 1, wherein step (c) comprises:
   (c1) putting all connected regions detected in step (b) in a set;
   (c2) selecting one of the connected regions from the set;
   (c3) searching for horizontal neighbors of the selected connected region, a horizontal neighbor being a connected region that (1) has a vertical position that is offset from that of the selected connected region by an amount smaller than a predetermined threshold, and (2) among all of the connected regions that meet criterion (1), is located closest horizontally to the selected connected region;
   (c4) adding any horizontal neighbors found in the search of step (c3) to a line list that contains the selected connected region, and removing the horizontal neighbors from the set;
   (c5) for the horizontal neighbors found in step (c3), repeating the searching step (c3) and the adding and removing step (c4), until no horizontal neighbors are found in a search, whereby a line list is generated; and
   (c6) selecting another connected region from the set, and repeating steps (c3), (c4) and (c5) to generate another line list, until the set is empty,
   whereby a plurality of line lists are generated.

8. The method of claim 1, wherein step (g) comprises:
   based on the connected region detected in step (f), determining a plurality of potential word segmentation positions for the line segment, each potential word segmentation positions corresponding to a location in a gap between connected regions in the down-sampled line segment;
   defining all possible paths for the line segment, each path being a division of the line segment at all or some of the potential word segmentation positions that divide the line segment into a plurality of path segments;
   for each path, applying word recognition to each path segment to calculate a word recognition score for the path segment, and averaging word recognition scores for all the path segments to calculate an average word recognition score for the path;
   determining a path among all the possible paths for the line segment that has a highest average word recognition score; and
   segmenting the line segment into word segments according to the determined path.

9. A computer program product comprising a computer usable non-transitory medium having a computer readable program code embedded therein for controlling a data processing apparatus, the computer readable program code configured to cause the data processing apparatus to execute a process for segmenting an input image into line segments and word segments, the input image being a binary image containing text, the process comprising:
   (a) horizontally down sampling the input image using a first down-sampling ratio;

(b) detecting connected regions in the down-sampled image obtained in step (a);

(c) identifying horizontally neighboring connected regions that belong to same lines to form line lists containing such horizontally neighboring connected regions;

(d) segmenting the input image into a plurality of line segments of the input image, each line segment of the input image being a region of the input image that corresponds to a bounding box in the down-sampled image containing all connected regions in a corresponding line list obtained in step (c); and for each of the line segments of the input image obtained in step (d), (e) horizontally down sampling the line segment of the input image using a second down-sampling ratio;

(f) detecting connected regions in the down-sampled line segment obtained in step (e); and (g) segmenting the line segment of the input image into word segments at one or more word segmentation positions using the connected regions obtained in step (f), wherein the word segmentation positions are a subset of positions corresponding to locations in gaps between the connected regions in the down-sampled line segment of step (e) that have been detected in step (f), wherein the second down-sampling ratio is smaller than the first down-sampling ratio.

10. The computer program product of claim 9, wherein the first down-sampling ratio is calculated from the input image, and the second down-sampling ratio for each line segment is calculated from the line segment.

11. The computer program product of claim 10, wherein the process further comprises, before step (a), calculating the first down-sampling ratio, which comprises:

(h1) detecting connected regions in the input image;

(h2) calculating a horizontal distance between each pair of horizontally adjacent connected regions detected in step (h1);

(h3) calculating a first average horizontal distance which is an average of all horizontal distances calculated in step (h2); and (h4) setting the first down-sampling ratio based on the first average horizontal distance calculated in step (h3).

12. The computer program product of claim 11, wherein in step (h4), the first down-sampling ratio is equal to three times the first average horizontal distance.

13. The computer program product of claim 12, wherein the process further comprises, before step (e), calculating the second down-sampling ratio, which comprises:

(i1) detecting connected regions in the line segment obtained in step (d);

(i2) calculating a horizontal distance between each pair of horizontally adjacent connected regions obtained in step (i1);

(i3) calculating a second average horizontal distance which is an average of all horizontal distances calculated in step (i2); and (i4) setting the second down-sampling ratio based on the second average horizontal distance calculated in step (i3).

14. The computer program product of claim 13, wherein in step (i4), the second down-sampling ratio is equal to the second average horizontal distance.

15. The computer program product of claim 9, wherein step (c) comprises:

(c1) putting all connected regions detected in step (b) in a set;

(c2) selecting one of the connected regions from the set;

(c3) searching for horizontal neighbors of the selected connected region, a horizontal neighbor being a connected region that (1) has a vertical position that is offset from that of the selected connected region by an amount smaller than a predetermined threshold, and (2) among all of the connected regions that meet criterion (1), is located closest horizontally to the selected connected region;

(c4) adding any horizontal neighbors found in the search of step (c3) to a line list that contains the selected connected region, and removing the horizontal neighbors from the set;

(c5) for the horizontal neighbors found in step (c3), repeating the searching step (c3) and the adding and removing step (c4), until no horizontal neighbors are found in a search, whereby a line list is generated; and (c6) selecting another connected region from the set, and repeating steps (c3), (c4) and (c5) to generate another line list, until the set is empty, whereby a plurality of line lists are generated.

16. The computer program product of claim 9, wherein step (g) comprises:

based on the connected region detected in step (f), determining a plurality of potential word segmentation positions for the line segment, each potential word segmentation positions corresponding to a location in a gap between connected regions in the down-sampled line segment;

defining all possible paths for the line segment, each path being a division of the line segment at all or some of the potential word segmentation positions that divide the line segment into a plurality of path segments;

for each path, applying word recognition to each path segment to calculate a word recognition score for the path segment, and averaging word recognition scores for all the path segments to calculate an average word recognition score for the path;

determining a path among all the possible paths for the line segment that has a highest average word recognition score; and segmenting the line segment into word segments according to the determined path.

* * * * *